United States Patent
Kawauchi et al.

(10) Patent No.: US 11,708,305 B2
(45) Date of Patent: Jul. 25, 2023

(54) GEOPOLYMER MOLDING PRODUCTION METHOD AND GEOPOLYMER MOLDING PRODUCTION SYSTEM

(71) Applicants: KABUSHIKI KAISHA TOSHIBA, Minato-Ku (JP); TOSHIBA ENERGY SYSTEMS & SOLUTIONS CORPORATION, Kawasaki (JP)

(72) Inventors: Kanae Kawauchi, Ota (JP); Hirofumi Okabe, Kawasaki (JP); Masaaki Kaneko, Yokohama (JP); Chiaki Namiki, Yokohama (JP); Tatsuaki Sato, Kawasaki (JP); Hideki Nakamura, Zushi (JP); Ryo Yamamoto, Yokohama (JP); Fumi Takahashi, Yokohama (JP)

(73) Assignees: KABUSHIKI KAISHA TOSHIBA, Minato-ku (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 858 days.

(21) Appl. No.: 16/481,657

(22) PCT Filed: Jan. 30, 2018

(86) PCT No.: PCT/JP2018/002994
§ 371 (c)(1),
(2) Date: Jul. 29, 2019

(87) PCT Pub. No.: WO2018/143205
PCT Pub. Date: Aug. 9, 2018

(65) Prior Publication Data
US 2019/0389770 A1 Dec. 26, 2019

(30) Foreign Application Priority Data

Feb. 3, 2017 (JP) .................................. 2017-018517
May 17, 2017 (JP) .................................. 2017-097992

(51) Int. Cl.
| | | |
|---|---|---|
| *C04B 28/00* | (2006.01) | |
| *C04B 12/00* | (2006.01) | |
| *C04B 18/04* | (2006.01) | |
| *C04B 40/00* | (2006.01) | |
| *C04B 103/00* | (2006.01) | |
| *C04B 111/00* | (2006.01) | |

(52) U.S. Cl.
CPC .......... *C04B 28/006* (2013.01); *C04B 12/005* (2013.01); *C04B 18/0463* (2013.01); *C04B 40/0071* (2013.01); *C04B 2103/0098* (2013.01); *C04B 2111/00862* (2013.01)

(58) Field of Classification Search
CPC ..... C04B 12/005; C04B 12/04; C04B 14/047; C04B 14/062; C04B 14/106; C04B 14/303; C04B 18/0463; C04B 18/08; C04B 18/10; C04B 18/141; C04B 18/146; C04B 22/062; C04B 28/006; C04B 40/0071; C04B 40/0085; C04B 40/0259; C04B 2103/0098; C04B 2111/00068; C04B 2111/00767; C04B 2111/00862; G21F 9/00; G21F 9/30; Y02P 40/10; Y02W 30/91

See application file for complete search history.

(56) References Cited

U.S. PATENT DOCUMENTS

| | | | |
|---|---|---|---|
| 5,474,606 A | 12/1995 | Twardowska et al. | |
| 5,798,307 A | 8/1998 | Davidovits et al. | |
| 7,883,576 B2 * | 2/2011 | Comrie ..................... | C10L 5/12 |
| | | | 106/692 |
| 2008/0178525 A1 | 7/2008 | Comrie | |
| 2013/0284070 A1 | 10/2013 | Dubey | |
| 2016/0031117 A1 * | 2/2016 | Abdullah .............. | C04B 12/005 |
| | | | 425/200 |
| 2017/0260090 A1 | 9/2017 | Chiang et al. | |

FOREIGN PATENT DOCUMENTS

| | | |
|---|---|---|
| CN | 1634795 A | 7/2005 |
| CN | 105565691 A | 5/2016 |
| JP | 11-504611 A | 4/1999 |
| JP | 2010-516613 A | 5/2010 |
| JP | 2012-167927 A | 9/2012 |
| JP | 5661492 B2 | 1/2015 |
| JP | 2015-518462 A | 7/2015 |
| JP | 5807785 B2 | 11/2015 |
| JP | 2017-156223 A | 9/2017 |
| JP | 2018-021808 A | 2/2018 |
| JP | 2018-065731 A | 4/2018 |
| JP | 2019-81308 A | 5/2019 |
| TW | I562974 B | 12/2016 |
| WO | WO 96/28398 A1 | 9/1996 |
| WO | WO 2008/094463 A1 | 8/2008 |
| WO | WO 2013/163009 A1 | 10/2013 |

OTHER PUBLICATIONS

International Search Report dated Mar. 20, 2018 in PCT/JP2018/002994 filed on Jan. 30, 2018.

* cited by examiner

*Primary Examiner* — Anthony J Green
(74) *Attorney, Agent, or Firm* — Oblon, McClelland, Maier & Neustadt, L.L.P.

(57) ABSTRACT

This geopolymer molding production method comprises: a mixing step (S1) for mixing a first material containing aluminum and silicon with a hydrate of an alkali stimulant containing a hydrate of an alkaline hydroxide and/or a hydrate of an alkaline silicate; a compaction step (S2) for compacting the mixture obtained in the mixing step (S1) into a compacted mixture; and a curing step (S3) for curing the compacted mixture.

20 Claims, 10 Drawing Sheets

| | | FIRST EXAMPLE | SECOND EXAMPLE | THIRD EXAMPLE | | FOURTH EXAMPLE |
|---|---|---|---|---|---|---|
| | | SAMPLE #1 | SAMPLE #2 | SAMPLE #3 | | SAMPLE #4 |
| MIXTURE | SOLIDIFICATION MATERIAL/AMOUNT [g] | METAKAOLIN/40.0 | METAKAOLIN/40.0 | METAKAOLIN/40.0 | | METAKAOLIN/40.0 |
| | ALKALINE STIMULANT /AMOUNT [g] | SODIUM METASILICATE NONAHYDRATE /32.0 | SODIUM METASILICATE NONAHYDRATE /32.0 | SODIUM METASILICATE NONAHYDRATE /32.0 | POTASSIUM ALUMINATE TRIHYDRATE /3.1 | SODIUM METASILICATE NONAHYDRATE /32.0 |
| | OTHER ADDITIVES /AMOUNT [g] | NONE | NONE | NONE | | CHABAZITE POWDER /80.0 |
| | USED AMOUNT OF MIXTURE [g] | 20.0 | 20.0 | 20.0 | | 20.0 |
| COMPRESSED MOLDING | MOLDING PRESSURE [MPa] | 20.0 | 20.0 | 10.0 | | 3.0 |
| | PRESSURIZATION TIME [MINUTES] | 10 | 10 | 10 | | 10 |
| | SUCCESS OR FAILURE OF MOLDING | SUCCESS | SUCCESS | SUCCESS | | SUCCESS |
| CURING CONDITIONS | PERIOD [DAY] | 23 | 7 | 7 | | 7 |
| | TEMPERATURE [°C] | 25 | 60 | 60 | | 60 |
| STRENGTH | UNIAXIAL COMPRESSIVE STRENGTH [MPa] | 12.6 | 34.9 | 38.0 | | 2.4 |

FIG. 3

|  | | FIFTH EXAMPLE | | |
|---|---|---|---|---|
|  | | SAMPLE #5 | SAMPLE #6 | SAMPLE #7 |
| MIXTURE | SOLIDIFICATION MATERIAL/AMOUNT [g] | METAKAOLIN/40.0 | METAKAOLIN/40.0 | METAKAOLIN/40.0 |
|  | ALKALINE STIMULANT /AMOUNT [g] | SODIUM METASILICATE NONAHYDRATE /32.0 | SODIUM METASILICATE NONAHYDRATE /32.0 | SODIUM METASILICATE NONAHYDRATE /32.0 |
|  | OTHER ADDITIVES /AMOUNT [g] | NONE | NONE | NONE |
|  | USED AMOUNT OF MIXTURE [g] | 20.0 | 20.0 | 20.0 |
| COMPRESSED MOLDING | MOLDING PRESSURE [MPa] | 1.0 | 5.0 | 10.0 |
|  | PRESSURIZATION TIME [MINUTES] | 10 | 10 | 10 |
|  | SUCCESS OR FAILURE OF MOLDING | SUCCESS | SUCCESS | SUCCESS |
| CURING CONDITIONS | PERIOD [DAY] | 7 | 7 | 7 |
|  | TEMPERATURE [°C] | 60 | 60 | 60 |
| STRENGTH | UNIAXIAL COMPRESSIVE STRENGTH [MPa] | 13.5 | 18.0 | 22.1 |

FIG. 4

|  |  | SIXTH EXAMPLE | | |
|---|---|---|---|---|
|  |  | SAMPLE #8 | SAMPLE #9 | SAMPLE #10 |
| MIXTURE | SOLIDIFICATION MATERIAL/AMOUNT [g] | METAKAOLIN/40.0 | METAKAOLIN/40.0 | METAKAOLIN/40.0 |
|  | ALKALINE STIMULANT /AMOUNT [g] | SODIUM METASILICATE NONAHYDRATE /32.0 | SODIUM METASILICATE NONAHYDRATE /32.0 | SODIUM METASILICATE NONAHYDRATE /32.0 |
|  | OTHER ADDITIVES /AMOUNT [g] | NONE | NONE | NONE |
|  | USED AMOUNT OF MIXTURE [g] | 20.0 | 20.0 | 20.0 |
| COMPRESSED MOLDING | MOLDING PRESSURE [MPa] | 20.0 | 20.0 | 20.0 |
|  | PRESSURIZATION TIME [MINUTES] | 10 | 10 | 10 |
|  | SUCCESS OR FAILURE OF MOLDING | SUCCESS | SUCCESS | SUCCESS |
| CURING CONDITIONS | PERIOD [DAY] | 5 | 10 | 30 |
|  | TEMPERATURE [°C] | 60 | 60 | 60 |
| PROGRESS OF REACTION | PRESENCE/ABSENCE OF PEAK OF SODIUM METASILICATE NONAHYDRATE AS CRYSTALLINE COMPOUND | PRESENT | PRESENT | NONE |

FIG. 5

GEOPOLYMER MOLDING PRODUCTION METHOD AND GEOPOLYMER MOLDING PRODUCTION SYSTEM

TECHNICAL FIELD

The present invention relates to a geopolymer molding production method and a geopolymer molding production system.

BACKGROUND ART

Low-dose radioactive waste with a relatively short half-life generated during operation of a nuclear power plant is packed into a drum and solidified. Although cement, asphalt and epoxy resin are generally used as a solidification material, solidification using geopolymer has been considered recently. Geopolymer is sometimes used as a building material or the like in addition to the solidification material for radioactive waste.

Geopolymer is an amorphous inorganic solidification material called aluminosilicate that is mainly composed of aluminum (Al) and silicon (Si). In terms of structure, geopolymer is devoid of water contained indivisibly, such as hydrate. However, water is necessary for mixing and reacting geopolymer raw materials. Hereinafter, geopolymer hardened into an arbitrary shape is referred to as a geopolymer molding, and the raw material constituting the geopolymer molding is referred to as a geopolymer raw material.

PRIOR ART DOCUMENT

Patent Document

Patent Document 1: JP 5807785 B2
Patent Document 2: JP 5661492 B2

DESCRIPTION OF INVENTION

Problems to be Solved by Invention

Geopolymer raw materials are often powdery or granular. When geopolymer is formed, in general, water is added to the geopolymer raw material and mixed in a slurry, this mixture is poured into a mold, and the polymerization reaction is advanced so that the mixture is hardened. The mixture of the geopolymer raw material and water in the form of slurry tends to adhere to stirring blades at the time of mixing, and also tends to clog a pipe or the like at the time of transfer. Thus, frequent maintenance of the device is necessary. Since the number of steps for maintenance increases, the production efficiency of geopolymer moldings decreases.

In view of the above-described problem, an object of the present invention is to provide a geopolymer molding production method and a geopolymer molding production system, which are capable of producing a geopolymer molding without slurrying a geopolymer raw material.

Means for Solving Problem

In order to solving problem mentioned above, in one embodiment of the present invention, a geopolymer molding production method comprising:

a mixing step in which a first substance containing aluminum and silicon is mixed with hydrate of an alkaline stimulant containing at least one of alkaline hydroxide hydrate and alkaline silicate hydrate;

a compression step in which a compressed mixture is formed by performing compression molding on a mixture obtained in the mixing step; and a curing step in which the compressed mixture is cured.

In order to solving problem mentioned above, in one embodiment of the present invention, a geopolymer molding production method comprising:

a mixing step in which a first substance containing aluminum and silicon, an alkaline stimulant containing at least one of alkaline hydroxide and alkali silicate, and hydrate containing crystal water are mixed;

a compression step in which a compressed mixture is formed by performing compression molding on a mixture obtained in the mixing step; and a curing step in which the compressed mixture is cured.

In order to solving problem mentioned above, in one embodiment of the present invention, a geopolymer molding production system comprising:

a mixture preparator configured to prepare a mixture by using at least a first substance containing aluminum and silicon and a second substance containing at least one of alkaline hydroxide and alkaline silicate from the first substance, the second substance, and a third substance which contains a compound having hydrate, in such a manner that the mixture contains aluminum and silicon as a first condition, the mixture contains at least one of alkaline hydroxide and alkaline silicate as a second condition, the mixture contains a compound having hydrate as a third condition;

a pressurizer equipped with a mold for containing the mixture and configured to apply pressure having been set in the mold; and a curing unit configured to maintain the mixture compression-molded by the pressurizer and equipped with an air conditioner adjusting temperature of atmosphere around the mixture.

Effects of the Invention

According to embodiments of the present invention, an object of the present invention is to provide a geopolymer molding production method and a geopolymer molding production system, which are capable of producing a geopolymer molding without decreased manufacturing efficiency.

BRIEF DESCRIPTION OF DRAWINGS

FIG. 3 is a list for showing (i) production conditions of the respective geopolymer moldings of the first to fourth examples (samples #1 to #4) produced by the geopolymer molding production method according to the present embodiment and (ii) strength test results of the respective geopolymer moldings of the first to fourth examples.

FIG. 4 is a list for showing (i) production conditions of respective geopolymer moldings of the samples #5 to #7 of the fifth example produced by the geopolymer molding production method according to the present embodiment and (ii) strength test results of the respective geopolymer moldings of the fifth example.

FIG. 5 is a list for showing production conditions of respective geopolymer moldings of the samples #8 to #10 of the sixth example produced by the geopolymer molding production method according to the present embodiment.

MODES FOR EMBODYING INVENTION

Hereinafter, a geopolymer molding production method and a geopolymer molding production system according to an embodiment of the present invention will be described by referring to the accompanying drawings.

Figure 1:
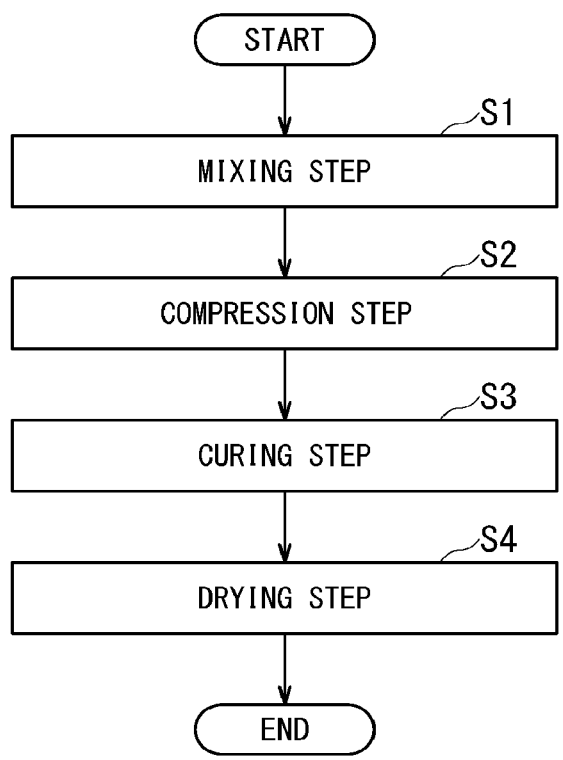
FIG. 1 is a flowchart illustrating a geopolymer molding production method according to the present embodiment.

FIG. 1 is a flowchart of the geopolymer molding production method according to the present embodiment. Each of the reference signs S1 to S4 in FIG. 1 is a reference sign indicative of the step number.

The geopolymer molding production method of the present embodiment includes a mixing step S1 of mixing a geopolymer raw material with necessary additives to obtain a mixture, a compression step S2 of compressing the mixture to form a compressed mixture, a curing step S3 of curing the compressed mixture, and a drying step S4 of drying the compressed mixture after the curing step, in such a manner that the mixture conditions described below are satisfied.

Hereinafter, the mixing step S1 will be described. In the mixing step S1, a mixture satisfying the mixture conditions is prepared. The mixture conditions include: containing at least a geopolymer raw material; and containing a compound having a substance (hydrate) which contains water molecules (hereinafter, referred to as "water providing material").

Figure 2:
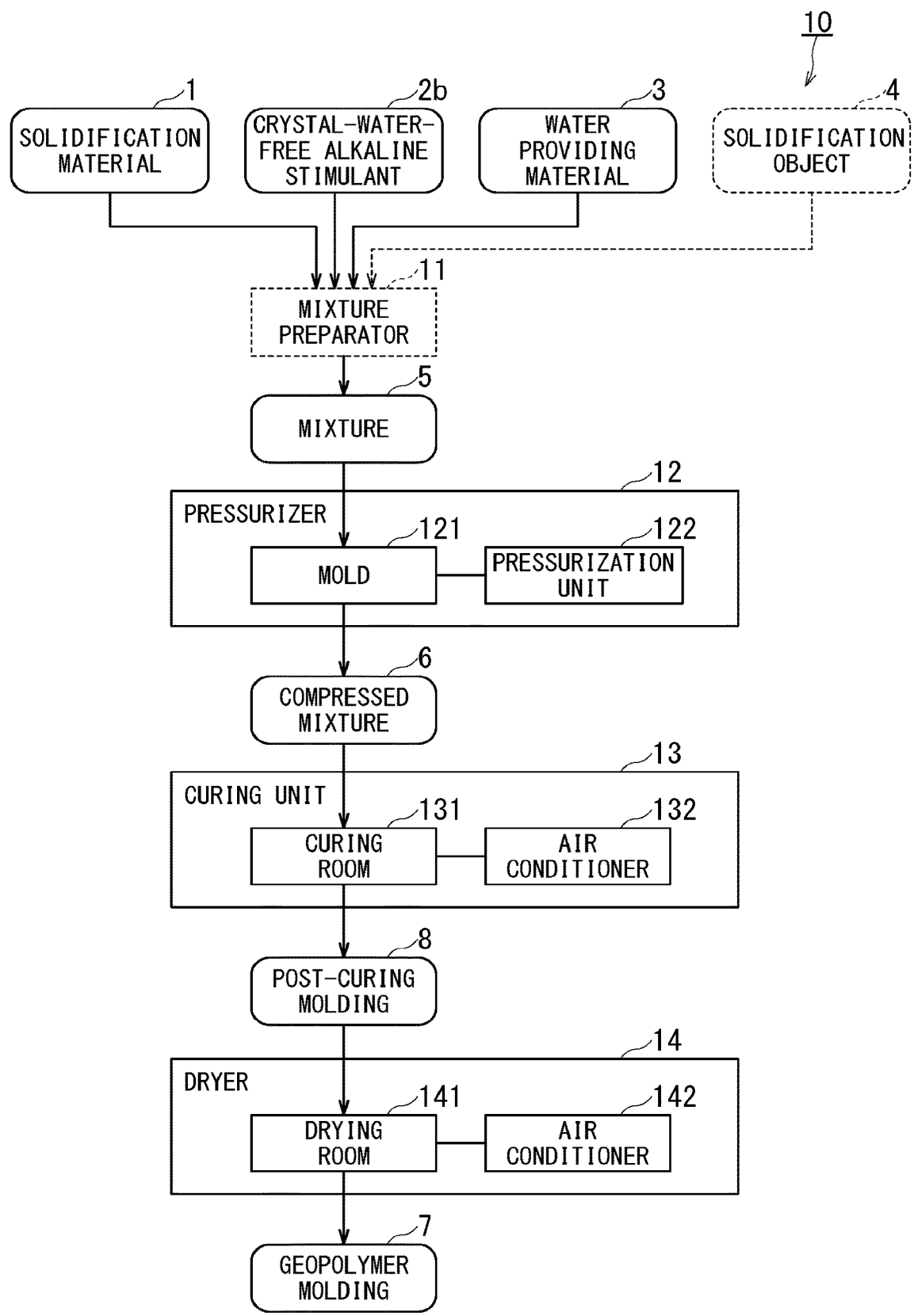
FIG. 2 is a schematic diagram illustrating a configuration of a geopolymer molding production system according to the present embodiment.

Here, the geopolymer raw material is a material for forming a geopolymer, and contains at least a solidification material 1 (FIG. 2) and an alkaline stimulant 2 (FIG. 2). Further, geopolymer refers to a polymer of an amorphous material that contains aluminum (Al) and silicon (Si) as main components.

As the solidification material 1, for instance, a compound containing aluminum (Al) and silicon (Si) (hereinafter referred to as "alumina-silica") can be used. The alumina-silica includes, e.g., metakaolin, blast furnace slag, incineration ash, fly ash, zeolite, mordenite, silica fume, amorphous silicon dioxide, aluminum oxide, and aluminum hydroxide. The above-described fly ash means the fly ash that is collected after burning finely pulverized coal and is managed as a product. Hereinafter, the solidification material 1 is also referred to as the first substance.

As the alkaline stimulant 2 (2a, 2b), for instance, alkaline hydroxide or alkaline silicate can be used. The alkaline hydroxide includes, e.g., lithium hydroxide, sodium hydroxide, potassium hydroxide, rubidium hydroxide, and cesium hydroxide. The silicate includes, e.g., lithium silicate, sodium silicate, potassium silicate, rubidium silicate, and cesium silicate.

Although various chemical forms such as ortho and meta exist as silicate, any chemical form of silicate can be employed as the alkaline stimulant 2 without being limited to a specific chemical form. It can be adopted as the alkaline stimulant 2 in which aluminate is further added to alkaline hydroxide and/or alkaline silicate. Hereinafter, the alkaline stimulant 2 is also referred to as the second substance.

As the water providing material 3 (FIG. 2), for instance, it is possible to use a compound containing neutral hydrate such as sodium sulfate decahydrate and it is also possible to use a compound containing alkaline hydrate such as alkaline silicate hydrate and alkaline aluminate hydrate. Hereinafter, the water providing material 3 is also referred to as the third substance.

In terms of polymerization reaction, the water providing material 3 is preferably a compound containing alkaline hydrate or a compound containing hydrate that has a melting point of 100° C. or less (hereinafter referred to as "low melting-point hydrate"). More preferably, the water providing material 3 is a compound containing alkaline low-melting-point hydrate. Among compounds containing alkaline low-melting-point hydrate, a compound having a melting point higher than the temperature of the workplace for preparing the mixture 5 (i.e., a compound which does not melt at the time of preparing the mixture 5) is further preferable as the water providing material 3.

Compounds containing alkaline hydrate include, e.g., alkaline silicate hydrate and alkaline aluminate hydrate. The silicate hydrate includes, e.g., lithium silicate hydrate, sodium silicate hydrate such as sodium metasilicate nonahydrate ($Na_2SiO_3 \cdot 9H_2O$), potassium silicate hydrate such as potassium tetrasilicate monohydrate, rubidium silicate hydrate, and cesium silicate hydrate. The aluminate hydrate includes, e.g., lithium aluminate hydrate, sodium aluminate hydrate, rubidium aluminate hydrate, and cesium aluminate hydrate, and potassium aluminate hydrate such as potassium aluminate trihydrate.

The low-melting-point hydrate includes, e.g., sodium metasilicate nonahydrate ($Na_2SiO_3 \cdot 9H_2O$: melting point 48° C.) and sodium metasilicate pentahydrate ($Na_2SiO_3 \cdot 5H_2O$: melting point 72° C.)

In the mixing step S1, the mixture satisfying the above-described mixture conditions differs in substance essential for mixing depending on whether the geopolymer raw material contains a compound having hydrate or not. Specifically, the mixture satisfying the above-described mixture conditions differs depending on whether the alkaline stimulant 2 is an alkali stimulant 2a containing the water providing material 3 (hereinafter referred to as a "crystal-water-containing alkali stimulant 2a") or is an alkali stimulant 2b which contains no compound having hydrate (hereinafter referred to as a "crystal-water-free alkali stimulant 2b").

More specifically, the above-described mixture conditions are satisfied when the following three conditions are satisfied. The first condition is "to contain aluminum and silicon", the second condition is "to contain at least one of alkaline hydroxide and alkaline silicate", and the third condition is "to include a compound having hydrate".

When the geopolymer raw material containing the crystal-water-containing alkaline stimulant 2a is mixed, the crystal-water-containing alkaline stimulant 2a satisfies two conditions, i.e., the second and third conditions among the first to third conditions. Thus, when the solidification material 1 satisfying the first condition and the crystal-water-containing alkaline stimulant 2a are mixed, all the first to third mixture conditions are satisfied. In this case, it is not necessarily required to further add the water providing material 3 satisfying the third condition separately from the geopolymer raw material. That is, in the mixing step S1, adding the water providing material 3 separately from the crystal-water-containing alkaline stimulant 2a can be omitted.

When the geopolymer raw material containing the crystal-water-free alkaline stimulant 2b is mixed, the crystal-water-free alkaline stimulant 2b satisfies only the second condition and does not satisfy the third condition. Thus, in order to prepare a mixture containing the water providing material 3, it is required to separately add the water providing material 3 satisfying the third condition in addition to the solidification material 1 satisfying the first condition and the crystal-water-free alkali stimulant 2b satisfying the second condition.

Among the above-described water providing materials 3, the alkaline silicate hydrate is hydrate of alkaline silicate applicable as the alkaline stimulant 2, and the alkaline aluminate hydrate is hydrate of alkaline aluminate applicable as the alkaline stimulant 2. In other words, it can be said that the alkaline silicate hydrate and the alkaline aluminate hydrate are the water providing material 3 functioning also as the alkaline stimulant 2 or the alkaline stimulant 2 functioning also as the water providing material 3.

Thus, in the present embodiment, the alkaline silicate hydrate and the alkaline aluminate hydrate can be applied not as the mere water providing material 3 but as the alkali stimulant 2 (crystal-water-containing alkali stimulant 2a) that serves also as the water providing material 3.

In addition, in the mixing step S1, a grindable solid can be added to the geopolymer raw material. The grindable solid is, e.g., a radionuclide adsorbent used in water purification. Besides, various wastes composed of grindable solids can be mixed with the geopolymer raw material. Various substances composed of grindable solids and the like to be added to the geopolymer raw material are referred to as solidification objects 4 or the fourth substance.

In the following description, a mixture 5 is defined as a mixture obtained and prepared in the mixing step S1 by mixing the solidification object 4 with (i) the geopolymer raw material containing the crystal-water-containing alkali stimulant 2a or (ii) the water providing material 3 and the geopolymer raw material containing the crystal-water-free alkaline stimulant 2b. When the solidification object 4 is not mixed, the mixture 5 is defined as a mixture prepared by mixing the solidification object 4 with (i) the geopolymer raw material containing the crystal-water-containing alkali stimulant 2a or (ii) the water providing material 3 and the geopolymer raw material containing the crystal-water-free alkaline stimulant 2b.

Next, the compression step S2 will be described. In the compression step S2, the mixture 5 is molded and compressed. The mixture 5 compressed and molded in the compression step S2 is referred to as a compression mixture 6. In the compressed mixture 6 obtained by performing pressure molding on the mixture 5 containing the solidification material 1 and the alkaline stimulant 2, the solidification material 1 and the alkaline stimulant 2 are in close contact with each other, and thus it is possible to create a state in which the reaction is more likely to proceed than in the case where pressure molding is not performed.

The pressure applied to the mixture 5 in the compression step S2 is set to a pressure of about 1 megapascal [MPa] or more in terms of producing the compressed mixture 6 by densification for stabilizing the obtained form. The upper limit value of the pressure is the upper limit value of the technically possible range.

Next, the curing step S3 will be described. The curing step S3 is a step of curing the compressed mixture 6 to advance the polymerization reaction. The water in the compressed mixture 6 serves as a reaction site in which the alkaline stimulant 2 and the solidification material 1 react, whereby the polymerization reaction proceeds. The water in the compressed mixture 6 is moisture (water) in the atmosphere absorbed by the compressed mixture 6, moisture originally contained in the mixture 5, and/or water derived from the hydrate contained in the mixture 5.

Although it is known that crystal water in hydrate is separated into moisture by heat above a certain level, crystal water in hydrate is considered to be easily separated due to the influence of ambient moisture and pressure. In the present embodiment, it is considered that the crystal water in the mixture 5 is easily converted into water by the compression step S2 in addition to the temperature and humidity conditions during curing and thereby the polymerization reaction is promoted.

In the curing step S3, the environment of the compressed mixture 6 is adjusted, such as the temperature of the atmosphere around the compressed mixture 6. Consequently, the dissociation of the crystal water of the hydrate inherent in the compressed mixture 6 is promoted, a reaction site is formed, and thereby the polymerization reaction can be promoted. The compressed mixture 6 in which the polymerization reaction has advanced is referred to as a post-curing molding 8.

Next, the drying step S4 will be described. The drying step S4 is a step of evaporating the water in the post-curing molding 8. Although the drying of the post-curing molding 8 proceeds naturally without manual intervention, drying can be promoted by adjusting the environment around the post-curing molding 8, such as the temperature of the atmosphere around the post-curing molding 8. The post-curing molding 8 that is sufficiently advanced in polymerization and satisfies an arbitrary water content is referred to as a geopolymer molding 7.

In some cases, the curing step S3 and the drying step S4 are not strictly distinguished. After the polymerization reaction in the compressed mixture 6 has proceeded in the curing step S3, it is conceivable that the evaporation of water proceeds without changing the ambient conditions in particular and it becomes the geopolymer molding 7.

Since water is not added separately from the geopolymer raw material in the mixing step S1, the water content of the mixture 5 is considerably lower than that of the mixture of water and the geopolymer raw material obtained by the conventional geopolymer molding production method, and the amount of water in the compressed mixture 6 and the post-curing molding 8 is also lower. Thus, when the water remaining in the post-curing molding 8 is sufficiently low in the curing step S3, i.e., when the water inside is sufficiently evaporated in the curing step S3, the drying step S4 can be omitted. The drying step S4 can be omitted also when there is no problem with the remaining water.

Although the compression mixture 6 having been subjected to the compression step S2 has not progressed in geopolymerization, such a compression mixture 6 may have sufficient strength depending on the application. Thus, at the stage of the compressed mixture 6, for instance, it may be delivered as a building material or a solidified waste. However, it is considered that geopolymerization is in progress during delivery and/or installation and the curing step S3 is performed. That is, in the process of molding the geopolymer molding 7, even when the curing step S3 is not artificially provided, the compressed mixture 6 having been subjected to the mixing step S1 and the compression step S2 naturally goes through the curing step S3 so as to become the geopolymer molding 7.

Next, the geopolymer molding production system according to the present embodiment will be described by showing one aspect (FIG. 2).

FIG. 2 is a schematic diagram illustrating the configuration of the geopolymer molding production system 10 as one aspect of the geopolymer molding production system according to the present embodiment.

The geopolymer molding production system 10 includes, e.g., a mixture preparator 11, a pressurizer 12, a curing unit 13, and a dryer 14.

When the crystal-water-containing alkali stimulant 2a is used as the alkaline stimulant 2, the mixture preparer 11 prepares the mixture 5 by mixing the solidification material 1 and the crystal-water-containing alkali stimulant 2a while adding the solidification object 4 in this mixture as needed.

When the crystal-water-free alkaline stimulant 2b is used as the alkaline stimulant 2, the mixture 5 is prepared by mixing the solidification material 1 and the crystal-water-free alkaline stimulant 2b while the solidification object 4 and the like are being added in this mixture as needed.

The pressurizer 12 has a function of producing the compressed mixture 6, which is a molding obtained by performing compression molding on the mixture 5. The pressurizer 12 includes, e.g., a mold 121 for containing the mixture 5 and a pressurization unit 122 for applying pressure to be set inside the mold 121.

Higher pressure applied to the mixture 5 at the time of producing the compressed mixture 6 is more advantageous in that the amount can be compressed at the time of producing waste. However, it should be noted that raising the upper limit of the pressure applied to the mixture 5 increases equipment cost and the like.

The curing unit 13 has a function of curing the compressed mixture 6 to promote the polymerization reaction. The curing unit 13 includes, e.g., a curing room 131 for providing a space for curing the compressed mixture 6 and an air conditioner 132 for adjusting the atmosphere of the curing room 131.

In the curing unit 13, the air conditioner 132 adjusts the atmosphere in the curing room 131 such that the water molecules of the hydrate inherent in the compressed mixture 6 melt, and thereby the air conditioner 132 adjusts the atmosphere in the curing room 131 to an environment suitable for promoting the polymerization reaction of the compressed mixture 6. When the water molecules of the hydrate inherent in the compressed mixture 6 melt, water is provided in the compressed mixture 6 to form a reaction site of the geopolymer reaction. At the reaction site having been formed, the polymerization reaction of the compressed mixture 6 proceeds.

The size of the curing room 131 is sufficient when it can cure at least one compressed mixture 6.

The air conditioner 132 has, e.g., a temperature control function of controlling the temperature of the atmosphere of the curing room 131, adjusts the temperature in the curing room 131, and maintains the temperature within a predetermined range. In addition, the air conditioner 132 is configured to be able to heat the room up to at least the melting point of the hydrate to be used, i.e., the melting point of the crystal-water-containing alkaline stimulant 2a or the water providing material 3.

The dryer 14 has a function of accelerating evaporation of water from the compressed mixture 6 in which the polymerization reaction has advanced, i.e., from the post-curing molding 8. The dryer 14 includes, e.g., a drying room 141 for providing a space for promoting evaporation (drying) of water inherent in the post-curing molding 8 and an air conditioner 142 for adjusting the internal atmosphere of the drying room 141.

In the dryer 14, the air conditioner 142 adjusts the atmosphere of the drying room 141 to a more preferable environment so as to accelerate the evaporation of the water inherent in the post-curing molding 8.

The size of the drying room 141 is sufficient when it can cure at least one compressed mixture 6.

The air conditioner 142 has, e.g., a function of adjusting the atmosphere conditions such as the temperature and the relative humidity of the drying room 141 so as to make a favorable environment for promoting the evaporation of water from the post-curing molding 8.

Although the above-described curing unit 13 and the dryer 14 are respectively an aspect provided with the air conditioner 132 and an aspect provided with the air conditioner 142, the air conditioners 132 and 142 can be omitted when curing and drying are sufficiently performed in the atmosphere.

In addition, the curing unit 13 can perform not only the curing step S3 for advancing the polymerization reaction but also the drying step S4 for evaporating the water remaining in the geopolymer after the polymerization reaction. After curing is performed in the curing unit 13 and thereby the geopolymer is formed, evaporation of water remaining in the geopolymer can be promoted by adjusting the temperature and humidity. In this case, the dryer 14 can be omitted.

Moreover, when it is delivered as a construction material or a waste body in the state of the compressed mixture 6 having passed through the pressurizer 12, the curing unit 13 and the dryer 14 can be omitted. Even when the curing unit 13 and the dryer 14 are not provided, the polymerization reaction and drying of the compressed mixture 6 proceed naturally.

Since the geopolymer molding production method (steps S1 to S4) and the geopolymer molding production system 10 use the compound containing hydrate as the water for forming the reaction site of the geopolymer reaction, the geopolymer reaction is allowed to proceed without adding water and thereby the geopolymer molding 7 (post-curing molding 8) can be produced.

In addition, since the mixture 5 is prepared without adding water, the mixture 5 is not slurried in contrast to the conventional geopolymer molding production method and the conventional geopolymer molding production system. Thus, it is possible to reduce the occurrence of troubles such as adhesion of the mixture 5 to the agitating blades at the time of mixing and clogging of pipes or the like at the time of transfer, and it is also possible to reduce inspection work in consideration of these troubles. Hence, the time required for troubleshooting and inspection work which occur in the conventional geopolymer molding production method and the like is reduced, and consequently, the production efficiency of the geopolymer molding 7 (post-curing molding 8) can be enhanced.

Since the crystal-water-containing alkaline stimulant 2a which is a compound containing hydrate is used as the alkaline stimulant 2, in addition to eliminating the need for the addition of water, the number of substances required for the preparation of the mixture 5 can be reduced. Furthermore, water can be uniformly dispersed in the compressed mixture 6 by using the crystal-water-containing alkaline stimulant 2a as the alkaline stimulant 2. Hence, the geopolymer reaction can be initiated by melting the inherent hydrate, and a homogeneous geopolymer molding 7 (post-curing molding 8) can be obtained.

Next, a description will be given of each example (first to sixth examples) of the molding produced by applying the geopolymer molding production method according to the present embodiment. In the description of the first to fifth examples, the finally obtained molding including the case where the drying step is omitted will be referred to as the geopolymer molding 7.

FIRST EXAMPLE

Metakaolin (average grain diameter: 1.3 micrometers [μm]) was used as the solidification material 1. Sodium metasilicate nonahydrate, which is a crystal-water-containing alkaline stimulant 2a and also functions as the water providing material 3, was used as the alkaline stimulant 2. Specifically, a mixture 5 (mixed powder) was prepared by adding 40.0 g of the metakaolin and 32.0 g of the sodium metasilicate nonahydrate.

Next, 20.0 g of the mixed powder as the obtained mixture 5 was separated to be placed in a mold 121 having a diameter of 30 mm (30 mm(p) (FIG. 2), then subjected to compression molding for 10 minutes at a molding pressure of 20.0 MPa, and then the mixture 5 was demolded from the mold 121. The demolded mixture 5 was a molding capable of stably maintaining its shape, and a compressed mixture 6 was obtained.

Next, the compressed mixture 6 demolded from the mold 121 was placed in a curing room 131 (FIG. 2), and curing was performed for 23 days under the condition of a temperature of 25° C.

Subsequently, uniaxial compressive strength of the post-curing molding 8, which is the compressed mixture 6 after curing (i.e., geopolymer molding 7), was measured. In the first example, the drying step was omitted.

SECOND EXAMPLE

Metakaolin (average grain diameter: 1.3 μm) was used as the solidification material 1. Sodium metasilicate nonahydrate, which is the crystal-water-containing alkaline stimulant 2a and also functions as the water providing material 3, was used as the alkaline stimulant 2. Specifically, a mixture 5 (mixed powder) was prepared by adding 40.0 g of the metakaolin and 32.0 g of the sodium metasilicate nonahydrate.

Next, 20.0 g of the mixed powder as the obtained mixture 5 was separated to be placed in the mold 121 having a diameter of 30 mmφ (FIG. 2), then subjected to compression molding for 10 minutes at a molding pressure of 20.0 MPa, and then the mixture 5 was demolded from the mold 121. The demolded mixture 5 was a molding capable of stably maintaining its shape, and a compressed mixture 6 was obtained.

Next, the compressed mixture 6 demolded from the mold 121 was placed in the curing room 131 (FIG. 2), and curing was performed for 7 days under the condition of a temperature of 60° C.

Subsequently, uniaxial compressive strength of the post-curing molding 8, which is the compressed mixture 6 after curing, was measured. From the viewpoint of estimating the amount of water contained in the post-curing molding 8, the mass of the post-curing molding 8 was measured.

Subsequently, the geopolymer molding 7 was further placed in a drying room 141 (FIG. 2) so as to be subjected to drying for 24 hours at a temperature of 200° C., and the mass of the obtained geopolymer molding 7 was measured. The water content (mass percentage) of the post-curing molding 8 was calculated from the measured mass of the post-curing molding 8 and the measured mass of the geopolymer molding 7. As a result of the calculation, the water content of the post-curing molding 8 was 3.2 mass percent.

THIRD EXAMPLE

Metakaolin (average grain diameter: 1.3 μm) was used as the solidification material 1. Potassium aluminate trihydrate and sodium metasilicate nonahydrate, which are the crystal-water-containing alkaline stimulant 2a and function also as the water providing material 3, were used as the alkaline stimulant 2. Specifically, a mixture 5 (mixed powder) was prepared by adding 40.0 g of the metakaolin, 32.0 g of the sodium metasilicate nonahydrate, and 16.5 g of the potassium aluminate trihydrate.

Next, 20.0 g of the mixed powder as the obtained mixture 5 was separated to be placed in the mold 121 having a diameter of 30 mmφ (FIG. 2), then subjected to compression molding for 10 minutes at a molding pressure of 10.0 MPa, and then the mixture 5 was demolded from the mold 121. The demolded mixture 5 was a molding capable of stably maintaining its shape, and a compressed mixture 6 was obtained.

Next, the compressed mixture 6 demolded from the mold 121 was placed in the curing room 131 (FIG. 2), and curing was performed for 7 days under the condition of a temperature of 60° C.

Subsequently, uniaxial compressive strength of the geopolymer molding 7 obtained after curing was measured. In the third example, the drying step was omitted.

FOURTH EXAMPLE

Metakaolin (average grain diameter: 1.3 μm) was used as the solidification material 1. Sodium metasilicate nonahydrate, which is the crystal-water-containing alkaline stimulant 2a and also functions as the water providing material 3, was used as the alkaline stimulant 2. As one case of the solidification object 4, chabazite, which is a mimic of a spent radionuclide adsorbent (radioactive waste), was used. Specifically, a mixture 5 (mixed powder) was prepared by adding 40.0 g of the metakaolin, 32.0 g of the sodium metasilicate nonahydrate, and 80 g of the chabazite powder.

Next, 20.0 g of the mixed powder as the obtained mixture 5 was separated to be placed in the mold 121 having a diameter of 30 mmφ (FIG. 2), then subjected to compression molding for 10 minutes at a molding pressure of 3.0 MPa, and then the mixture 5 was demolded from the mold 121. The demolded mixture 5 was a molding capable of stably maintaining its shape, and a compressed mixture 6 was obtained.

Next, the compressed mixture 6 demolded from the mold 121 was placed in the curing room 131 (FIG. 2), and curing was performed for 7 days under the condition of a temperature of 60° C.

Subsequently, uniaxial compressive strength of the geopolymer molding 7 obtained after curing was measured. In the fourth example, the drying step was omitted.

FIFTH EXAMPLE

Metakaolin (average grain diameter: 1.3 μm) was used as the solidification material 1. Sodium metasilicate nonahydrate, which is the crystal-water-containing alkaline stimulant 2a and also functions as the water providing material 3, was used as the alkaline stimulant 2. Specifically, a mixture 5 (mixed powder) was prepared by adding 40.0 g of the metakaolin, and 32.0 g of the sodium metasilicate nonahydrate.

Next, four 30 mmv molds 121 (FIG. 2) were prepared, 20.0 g of the mixed powder as the obtained mixture 5 was separated, and then each of the prepared first to fourth molds 121 was filled with 20.0 g of the obtained mixture 5. Thereafter, the mixture 5 filled in the first mold 121 was subjected to compression molding for 10 minutes at a molding pressure of 1.0 MPa, and the mixture 5 was demolded from the first mold 121. The mixture 5 filled in the second mold 121 was subjected to compression molding for 10 minutes at a molding pressure of 5.0 MPa, and the mixture 5 was demolded from the second mold 121. The mixture 5 filled in the third mold 121 was subjected to compression molding for 10 minutes at a molding pressure of 10.0 MPa, and the mixture 5 was demolded from the third mold 121. The mixture 5 filled in the fourth mold 121 was subjected to compression molding for 10 minutes at a molding pressure of 20.0 MPa, and the mixture 5 was demolded from the fourth mold 121.

Every mixture 5 removed from each of the first to fourth molds 121 was a molding capable of stably maintaining its shape, and compressed mixtures 6 were obtained.

Next, the four compressed mixtures (i.e., first to fourth compressed mixtures) 6 demolded from the respective first to fourth molds 121 were placed in the curing room 131 (FIG. 2), and curing was performed on them for 7 days under the condition of a temperature of 60° C.

Subsequently, uniaxial compressive strength of each of the first to fourth geopolymer moldings 7, which were obtained by performing the curing step on the first to fourth compressed mixtures 6 under the above-described conditions, was measured. In the fifth example, the drying step was omitted.

SIXTH EXAMPLE

Metakaolin (average grain diameter: 1.3 μm) was used as the solidification material 1. Sodium metasilicate nonahydrate, which is the crystal-water-containing alkaline stimulant 2a and also functions as the water providing material 3, was used as the alkaline stimulant 2. Specifically, a mixture 5 (mixed powder) was prepared by adding 40.0 g of the metakaolin and 32.0 g of the sodium metasilicate nonahydrate.

Next, three 30 mmp molds 121 (FIG. 2) were prepared, 20.0 g of the mixed powder as the obtained mixture 5 was separated, and then each of the prepared molds 121 was filled with 20.0 g of the obtained mixture 5. The mixture 5 filled in every mold 121 was subjected to compression molding for 10 minutes at a molding pressure of 20.0 MPa, and the mixture 5 was demolded from each mold 121.

Every mixture 5 removed from each of the molds 121 was a molding capable of stably maintaining its shape, and thereby three compressed mixtures 6 were obtained. These three compressed mixtures 6 obtained here correspond to the fourth compressed mixture 6 in the above-described fifth example, and are respectively referred to as the fifth to seventh compressed mixtures 6 in the following description.

Next, the three compressed mixtures 6 demolded from the respective molds 121 were placed in the curing room 131 (FIG. 2), and curing was performed on them under the condition of a temperature of 60° C. for a different curing period. The curing period was 5 minutes for the fifth compressed mixture 6, 10 minutes for the sixth compressed mixture 6, and 30 minutes for the seventh compressed mixture 6.

The X-ray diffraction spectrum was measured by a powder X-ray diffractometry for the fifth to seventh compressed mixtures 6 having been subjected to curing of the above-described respective curing periods. In the sixth example, the drying step was omitted.

(Analysis Result of Uniaxial Compression Strength)

Next, a description will be given of the measurement results of uniaxial compressive strength of the geopolymer moldings 7 (samples #1 to #10) according to the first to fifth examples.

FIG. 3 to FIG. 5 are lists for showing (i) production conditions of the geopolymer moldings of the first to fourth examples produced by the geopolymer molding production method according to the present embodiment and (ii) the strength test result of the geopolymer moldings of the first to fourth examples.

The samples #1 to #4 described in FIG. 3 are the geopolymer moldings 7 obtained in the first to fourth examples, respectively.

The samples #5 to #7 described in FIG. 4 are the first to third geopolymer moldings 7 obtained in the fifth example, respectively. The production conditions of the fourth geopolymer molding 7 in the fifth example are the same as the geopolymer molding production conditions in the second example, and overlap with the geopolymer molding production conditions and strength test result of the sample #2 described in FIG. 3. For this reason, the production conditions of the fourth geopolymer molding 7 in the fifth example are not described in FIG. 4.

The samples #8 to #10 described in FIG. 5 are moldings obtained by curing the fifth to seventh compressed mixtures 6, respectively.

As to the geopolymer molding production conditions and strength test results shown in FIG. 3 (samples #1 to #4), the measurement result of uniaxial compression strength of the geopolymer molding 7 of the sample #1 (first example) was 12.6 MPa. Although a uniaxial compression strength 1.47 MPa of solidified radioactive waste is required for solidifying radioactive waste by using cement (hereinafter referred to as "cement solidified body"), the geopolymer molding 7 with sufficient uniaxial compressive strength for the uniaxial compressive strength 1.47 MPa was obtained.

In the sample #2 (second example), the measurement result of uniaxial compression strength of the geopolymer molding 7 was 34.9 MPa, and the geopolymer molding 7 with sufficient uniaxial compressive strength with respect to the uniaxial compressive strength 1.47 MPa required for a cement solidified body was obtained.

In the second example, the curing temperature was set to 60° C. higher than the melting point of sodium metasilicate nonahydrate, and consequently, a geopolymer molding 7 with higher uniaxial compressive strength was obtained with a curing period (7 days) shorter than that of the first example (23 days of curing period).

In the sample #3 (third example), the measurement result of uniaxial compression strength of the geopolymer molding 7 was 38.0 MPa, and the geopolymer molding 7 with sufficient uniaxial compressive strength with respect to the uniaxial compressive strength 1.47 MPa required for a cement solidified body was obtained.

In the third example, potassium aluminate trihydrate was further added to the second example, and consequently, a geopolymer molding 7 with further higher uniaxial compressive strength was obtained under the same curing conditions as the second example.

In the sample #4 (fourth example), the measurement result of uniaxial compression strength of the geopolymer molding 7 was 2.4 MPa. Also in the case of adding chabazite as the solidification object 4, the geopolymer molding 7 with sufficient uniaxial compressive strength with respect to the uniaxial compressive strength 1.47 MPa required for a cement solidified body was obtained.

As to the geopolymer molding production conditions and strength test results shown in FIG. 4 (samples #5 to #7), the measurement results of uniaxial compressive strength for the respective geopolymer moldings 7 of the fifth example were 13.5 MPa for the sample #5, 18.0 MPa for the sample #6, and 22.1 MPa for the sample #7. Also in the case of the samples #5 to #7, the geopolymer moldings 7 having sufficient uniaxial compressive strength with respect to the uniaxial compressive strength of 1.47 MPa required for the cement solidified body were obtained under any molding pressure conditions.

Next, the relationship between the molding pressure and the obtained uniaxial compression strength of the geopolymer molding 7 will be discussed.

Figure 6:
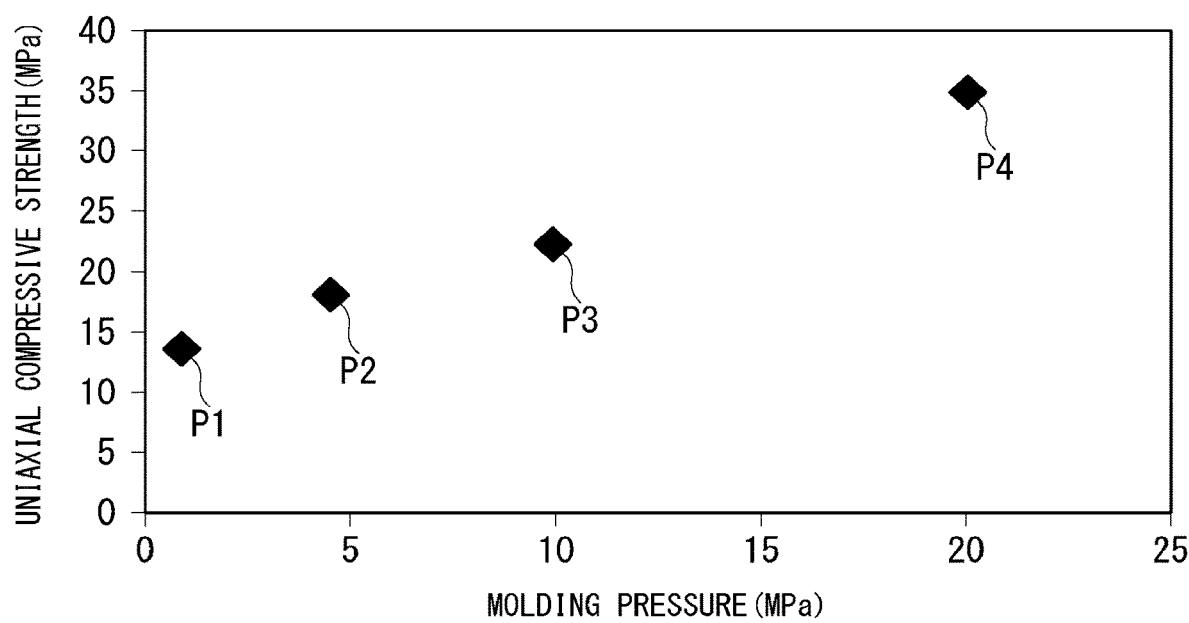
FIG. 6 is a graph showing uniaxial compressive strength of the respective geopolymer moldings of the samples #5, #6, #8, and #2 to be obtained with respect to molding pressure.

FIG. 6 is a graph showing uniaxial compressive strength of each geopolymer molding 7 (samples #5, #6, #8, #2) obtained with respect to molding pressure.

In FIG. 6, the points P1, P2, P3, and P4 indicative of uniaxial compressive strength corresponds to the samples #5, #6, #7, and #2, respectively. Uniaxial compressive strength was 13.5 MPa for the sample #5, 18.0 MPa for the sample #6, 22.1 MPa for the sample #7, and 34.9 MPa for the sample #2. As the molding pressure increases, a geopolymer molding 7 having higher compressive strength was obtained.

Even the sample #5 having the lowest uniaxial compressive strength in the above four samples provided a geopolymer molding 7 which has sufficient uniaxial compressive strength with respect to uniaxial compressive strength of 1.47 MPa required for a cement solidified body. Thus, when the geopolymer molding 7 is used as a substitute for a cement solidified body, it is considered that a molding pressure of at least 1.0 MPa is sufficient.

(Analysis Results by Powder X-ray Diffractometry)

Next, measurement results (X-ray diffraction pattern) by the X-ray diffraction method will be described as analysis results of the moldings according to the first to sixth examples.

Figure 7:
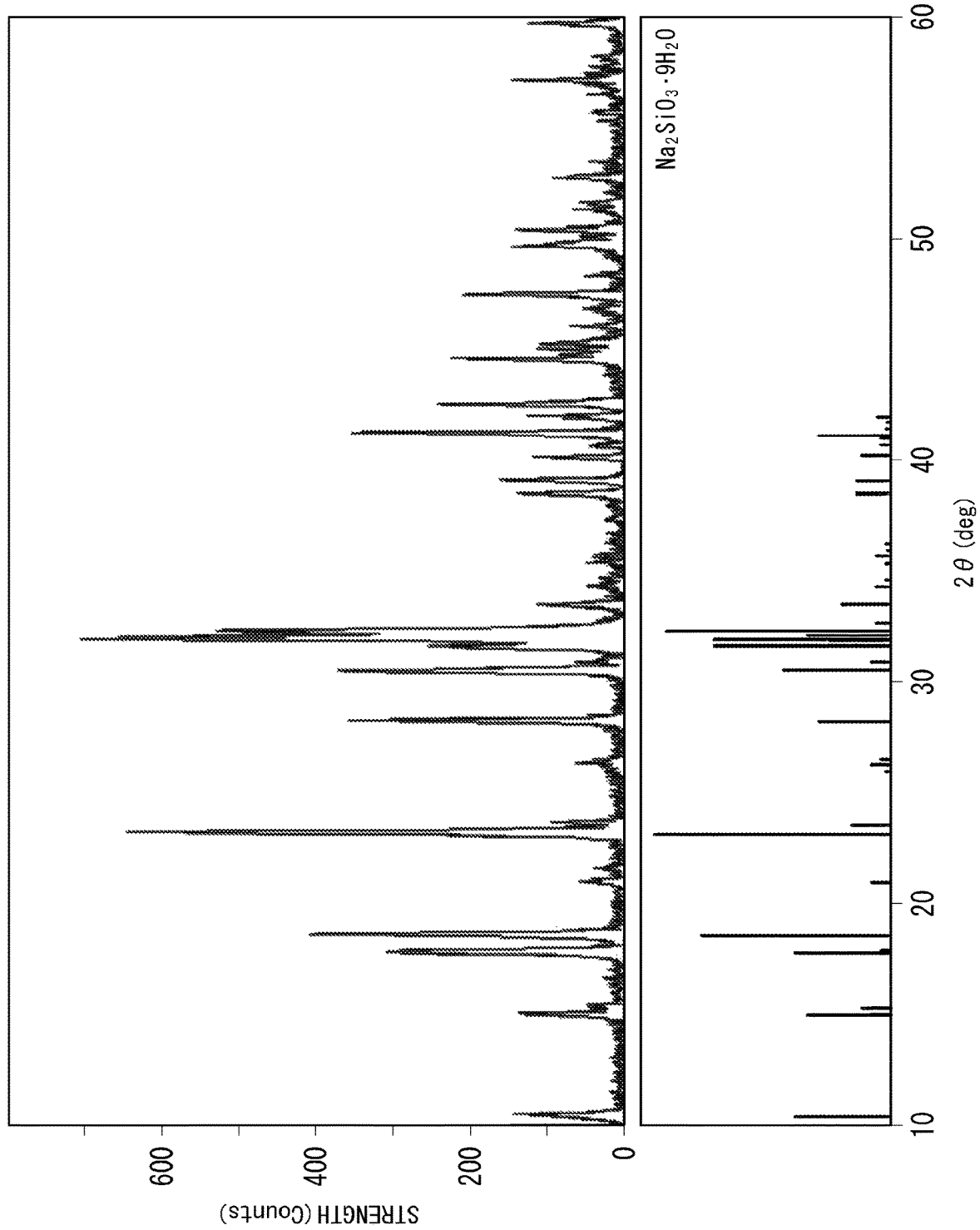
FIG. 7 is a schematic diagram for showing an X-ray diffraction measurement result (X-ray diffraction pattern) of the mixture (powder) prepared in the second example.

FIG. 7 is a schematic diagram for showing the X-ray diffraction measurement result (X-ray diffraction pattern) of the mixture (powder) 5 prepared in the second example.

Figure 8:
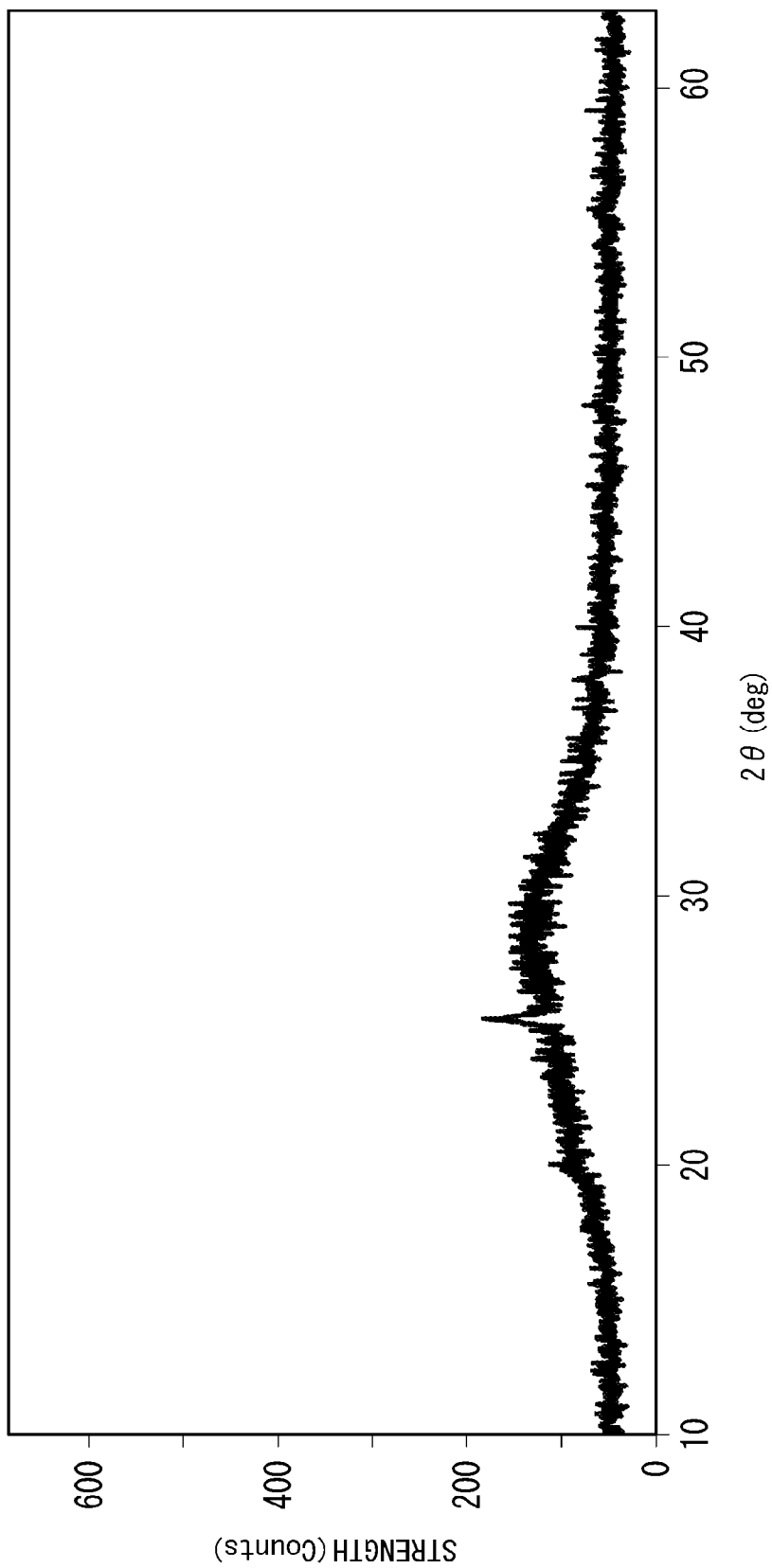
FIG. 8 is a schematic diagram for showing an X-ray diffraction measurement result (X-ray diffraction pattern) of a pulverized material obtained by pulverizing the finally obtained molding (sample #2) in the second example.

FIG. 8 is a schematic diagram for showing the X-ray diffraction measurement result (X-ray diffraction pattern) of the pulverized material obtained by pulverizing the finally obtained molding (sample #2) in the second example.

Figure 9A:
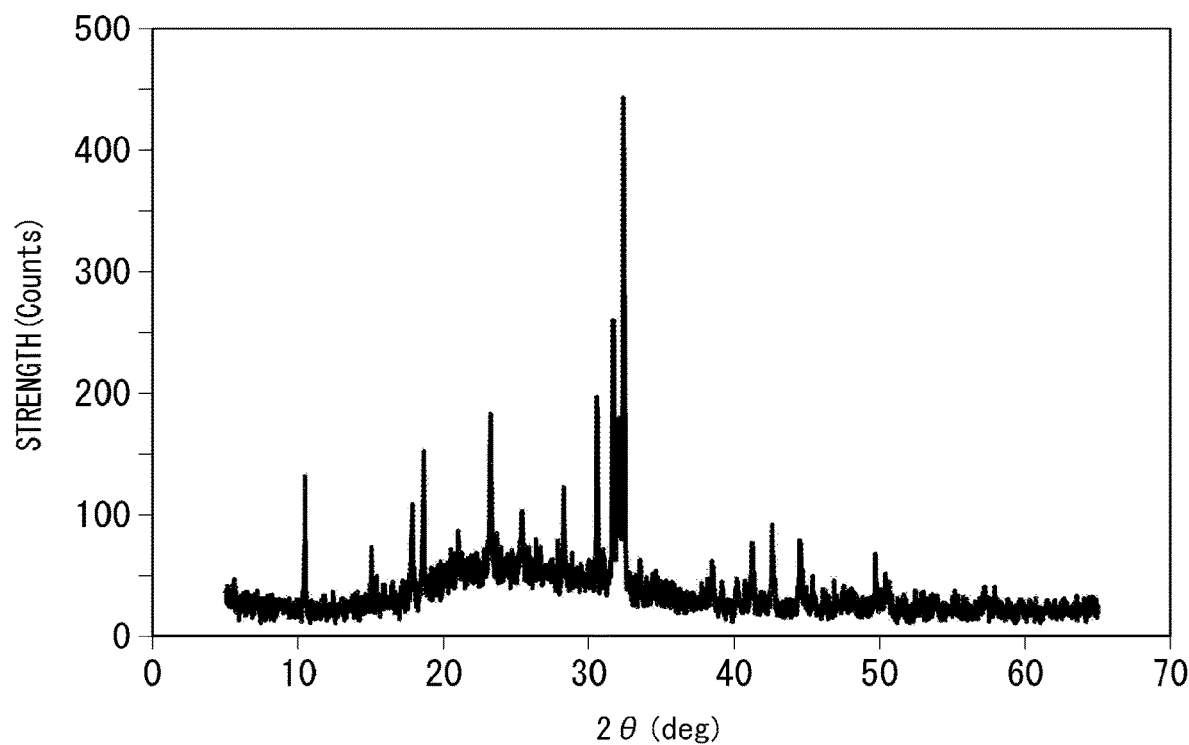
FIG. 9A is a schematic diagram for showing an X-ray diffraction measurement result (X-ray diffraction pattern) of a pulverized material obtained by pulverizing the finally obtained sample #8 in the sixth example.

FIG. 9A is a schematic diagram for showing the X-ray diffraction measurement result (X-ray diffraction pattern) of the pulverized material obtained by pulverizing the finally obtained sample #8 in the sixth example.

Figure 9B:
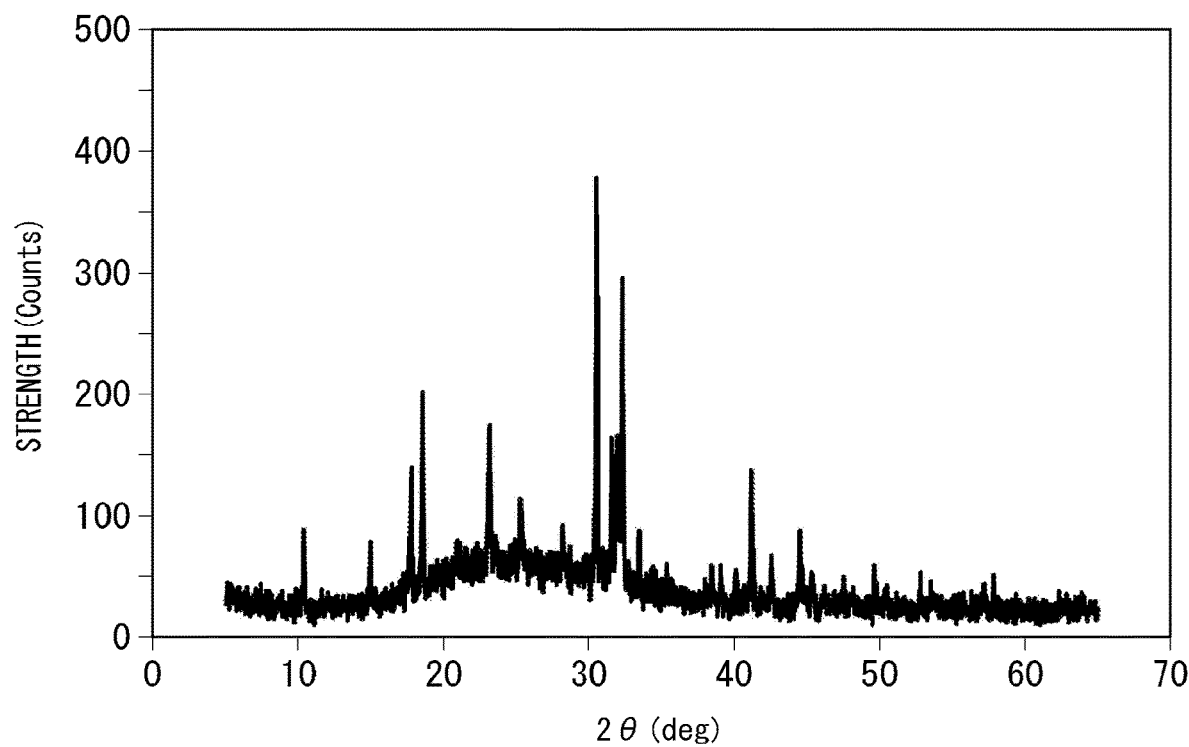
FIG. 9B is a schematic diagram for showing an X-ray diffraction measurement result (X-ray diffraction pattern) of a pulverized material obtained by pulverizing the finally obtained sample #9 in the sixth example.

FIG. 9B is a schematic diagram for showing the X-ray diffraction measurement result (X-ray diffraction pattern) of the pulverized material obtained by pulverizing the finally obtained sample #9 in the sixth example.

Figure 10:
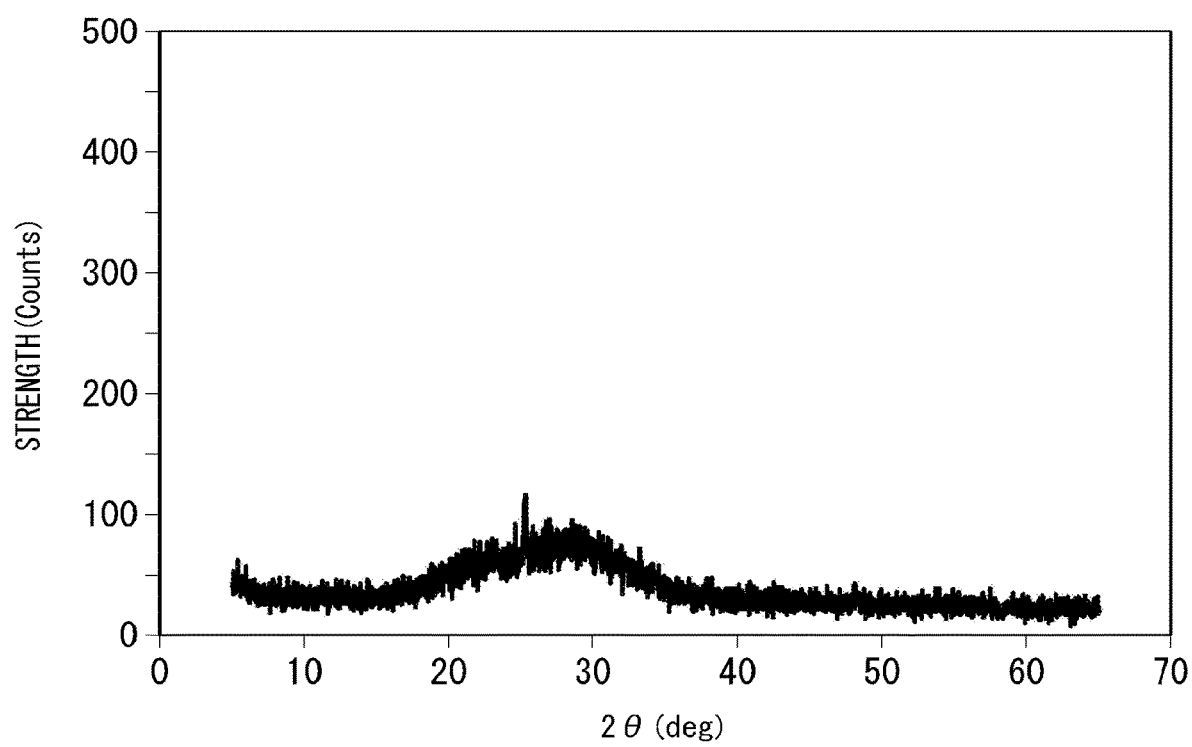
FIG. 10 is a schematic diagram for showing an X-ray diffraction measurement result (X-ray diffraction pattern) of a pulverized material obtained by pulverizing the finally obtained sample #10 in the sixth example.

FIG. 10 is a schematic diagram for showing the X-ray diffraction measurement result (X-ray diffraction pattern) of the pulverized material obtained by pulverizing the finally obtained sample #10 in the sixth example.

According to the analysis result by the powder X-ray diffractometry shown in FIG. 7, it was confirmed that the X-ray diffraction spectrum of the mixture 5 satisfying the mixture conditions showed the peak of the sodium metasilicate nonahydrate being present as a crystalline compound in the mixture 5. In other words, it was confirmed that the polymer reaction did not progressed in the mixture 5 satisfying the mixture conditions and this mixture 5 was in the state where the solidification material 1 and the crystal-water-containing stimulant 2a were simply mixed.

According to the analysis result by the powder X-ray diffractometry shown in FIG. 8, it was confirmed that the peak of sodium metasilicate nonahydrate ($Na_2SiO_3 \cdot 9H_2O$) as a crystalline compound was not present in the X-ray diffraction spectrum of the finally obtained molding (geopolymer molding 7) and the peak confirmed in the mixture 5 disappeared. In other words, the finally obtained molding in the second example was in the state where sodium metasilicate nonahydrate ($Na_2SiO_3 \cdot 9H_2O$) as a crystalline compound was amorphized and a polymer reaction was in progress. That is, it can be seen that a geopolymer molding 7 was formed.

Specifically, it is found that water was uniformly supplied in the compressed mixture 6 being a precursor of a geopolymer molding 7 and the polymer reaction proceeded uniformly. Since the moisture around the compacted mixture and the moisture in the geopolymer raw material alone are insufficient for the polymer reaction of the whole compressed mixture, it is considered that the crystal water of the hydrate in the geopolymer raw material contributes to the polymer reaction.

Although the results shown in FIG. 7 and FIG. 8 are the analysis results of the mixture 5 and the geopolymer molding 7 (sample #2) according to the second example, it is confirmed that similar analysis results can be obtained for the first, third, fourth, and fifth examples (samples #1 and #3 to #7).

According to FIG. 9A, FIG. 9B, and FIG. 10, the following was confirmed regarding the curing period. That is, the peak of sodium metasilicate nonahydrate ($Na_2SiO_3 \cdot 9H_2O$) being present as a crystalline compound in the mixture 5 remains in the X-ray diffraction spectrum of the pulverized material of each of the sample #8 shown in FIG. 9A and the sample #9 shown in FIG. 10 similarly to the result shown in FIG. 7 and the polymer reaction was not completely advanced. In other words, it is confirmed that a curing period of 10 minutes or less is insufficient for terminating the polymer reaction.

As to the X-ray diffraction spectrum of the pulverized material of the sample #10 shown in FIG. 11, it was confirmed that the peak of sodium metasilicate nonahydrate being present as a crystalline compound in the mixture 5 was not present and disappeared similarly to the result shown in FIG. 8. In other words, it was confirmed that the polymer reaction proceeded to polymerize it when the curing period was 30 minutes.

When the above-described geopolymer molding production method and the geopolymer molding production system are applied, a geopolymer molding can be produced without slurrying the geopolymer raw material and the like. Thus, maintenance for adhesion to the production system or the like is reduced, and a geopolymer molding can be produced without decreasing production efficiency.

Water can be homogeneously supplied by using a compound having hydrate instead of water for a water-providing material, and consequently, it is possible to advance the geopolymer reaction and produce a uniform geopolymer molding.

When a geopolymer molding contains radioactive waste, the water contained in the geopolymer molding must be evaporated in order to prevent explosion due to hydrogen generated from radiolyzed water. According to the above-described geopolymer molding production method and the geopolymer molding production system, amount of water for forming a reaction site can be reduced to a very small amount by adding a compound having hydrate without adding water, so that the time required for the drying step can be shortened and the drying step can be omitted in some cases. Hence, it is possible to reduce energy and time required for water removal processing than in the conventional technique.

Since a crystal-water-containing alkali stimulant is used, a mixture for forming a reaction site can be prepared by mixing a solidification material and a crystal-water-containing alkali stimulant without separately adding a water providing material. Thus, a geopolymer molded body can be manufactured with less material.

The above embodiments are not intended to limit the scope of the inventions. Indeed, the novel methods and systems described herein may be embodied in a variety of other forms; furthermore, various omissions, substitutions and changes in the form of the methods and systems described herein may be made without departing from the framework of the inventions. The above-cited invention and their equivalents are intended to cover such forms or modifications as would fall within the scope and spirit of the inventions.

REFERENCE SIGNS LIST 1 solidification material
2 alkaline stimulant
2a crystal-water-containing alkali stimulant
2b crystal-water-free alkali stimulant
3 water providing material
4 solidification object
5 mixture
6 compressed mixture
7 geopolymer molding
8 post-curing molding
10 geopolymer molding production system
11 mixture preparator
12 pressurizer
13 curing unit
14 dryer
121 mold
122 pressurization unit
13 curing unit
131 curing room
132 air conditioner
14 dryer
141 drying room
142 air conditioner

The invention claimed is:

1. A geopolymer molding production method comprising:
   a mixing step in which a first substance containing aluminum and silicon is mixed with hydrate of an alkaline stimulant containing alkaline hydroxide hydrate with aluminate;
   a compression step in which a compressed mixture is formed by performing compression molding on a mixture obtained in the mixing step; and
   a curing step in which the compressed mixture is cured, wherein
      the alkaline hydroxide hydrate with aluminate is at least one selected from lithium aluminate hydroxide hydrate, sodium aluminate hydroxide hydrate, potassium aluminate hydroxide hydrate, rubidium aluminate hydroxide hydrate, and cesium aluminate hydroxide hydrate.

2. The geopolymer molding production method according to claim 1, wherein the compressed mixture is formed by further adding a spent radionuclide adsorbent in the compression step.

3. The geopolymer molding production method according to claim 1, wherein temperature during curing in the curing step is above a melting point of hydrate contained in the mixture.

4. The geopolymer molding production method according to claim 1, wherein a period for curing the compressed mixture in the curing step is 30 minutes or longer.

5. The geopolymer molding production method according to claim 1, further comprising a drying step of drying the compressed mixture after the curing step.

6. The geopolymer molding production method according to claim 1, wherein the first substance contains at least one selected from metakaolin, blast furnace slag, incineration ash, fly ash, zeolite, silica fume, amorphous silicon dioxide, aluminum oxide, and aluminum hydroxide.

7. The geopolymer molding production method according to claim 1, wherein the hydrate contained in the mixture is a low-melting-point hydrate having a melting point of 0° C. or more and 100° C. or less.

8. The geopolymer molding production method according to claim 1, wherein pressure for compressing the mixture is at least 1 MPa.

9. A geopolymer molding production method comprising:
   a mixing step in which a first substance containing aluminum and silicon is mixed with hydrate of an alkaline stimulant containing alkaline silicate hydrate;
   a compression step in which a compressed mixture is formed by performing compression molding on a mixture obtained in the mixing step; and
   a curing step in which the compressed mixture is cured, wherein the hydrate contained in the mixture is the alkaline silicate hydrate and contains at least one selected from lithium silicate hydrate, sodium silicate hydrate, potassium silicate hydrate, rubidium silicate hydrate, and cesium silicate hydrate.

10. The geopolymer molding production method according to claim 9, wherein the compressed mixture is formed by further adding a spent radionuclide adsorbent in the compression step.

11. The geopolymer molding production method according to claim 9, wherein temperature during curing in the curing step is above a melting point of hydrate contained in the mixture.

12. The geopolymer molding production method according to claim 9, wherein a period for curing the compressed mixture in the curing step is 30 minutes or longer.

13. The geopolymer molding production method according to claim 9, further comprising a drying step of drying the compressed mixture after the curing step.

14. The geopolymer molding production method according to claim 9, wherein the first substance contains at least one selected from metakaolin, blast furnace slag, incineration ash, fly ash, zeolite, silica fume, amorphous silicon dioxide, aluminum oxide, and aluminum hydroxide.

15. A geopolymer molding production method comprising:
- a mixing step in which a first substance containing aluminum and silicon is mixed with hydrate of an alkaline stimulant containing alkaline aluminate hydrate;
- a compression step in which a compressed mixture is formed by performing compression molding on a mixture obtained in the mixing step; and
- a curing step in which the compressed mixture is cured,
- wherein the hydrate contained in the mixture is the hydrate containing alkaline aluminate hydrate and contains at least one selected from lithium aluminate hydrate, sodium aluminate hydrate, potassium aluminate hydrate, rubidium aluminate hydrate, and cesium aluminate hydrate.

16. The geopolymer molding production method according to claim 15, wherein the compressed mixture is formed by further adding a spent radionuclide adsorbent in the compression step.

17. The geopolymer molding production method according to claim 15, wherein temperature during curing in the curing step is above a melting point of hydrate contained in the mixture.

18. The geopolymer molding production method according to claim 15, wherein a period for curing the compressed mixture in the curing step is 30 minutes or longer.

19. The geopolymer molding production method according to claim 15, further comprising a drying step of drying the compressed mixture after the curing step.

20. The geopolymer molding production method according to claim 15, wherein the first substance contains at least one selected from metakaolin, blast furnace slag, incineration ash, fly ash, zeolite, silica fume, amorphous silicon dioxide, aluminum oxide, and aluminum hydroxide.

* * * * *